(12) United States Patent
Miyazaki

(10) Patent No.: US 8,860,680 B2
(45) Date of Patent: *Oct. 14, 2014

(54) INFORMATION PROCESSING APPARATUS, INFORMATION PROCESSING METHOD AND COMPUTER PROGRAM

(71) Applicant: Sony Corporation, Tokyo (JP)

(72) Inventor: Reiko Miyazaki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/906,948

(22) Filed: May 31, 2013

(65) Prior Publication Data

US 2013/0257737 A1    Oct. 3, 2013

Related U.S. Application Data

(63) Continuation of application No. 12/558,031, filed on Sep. 11, 2009, now Pat. No. 8,471,825.

(30) Foreign Application Priority Data

Sep. 12, 2008 (JP) ................................ 2008-234511

(51) Int. Cl.
G06F 3/041 (2006.01)
G06F 3/02 (2006.01)
G06F 3/044 (2006.01)
G06F 3/0488 (2013.01)

(52) U.S. Cl.
CPC G06F 3/02 (2013.01); G06F 3/044 (2013.01); G06F 3/0418 (2013.01); G06F 3/04886 (2013.01)
USPC ............ 345/173; 345/156; 345/168; 345/169

(58) Field of Classification Search
None
See application file for complete search history.

(56) References Cited

U.S. PATENT DOCUMENTS

| | | | |
|---|---|---|---|
| 4,790,028 A | 12/1988 | Ramage | |
| 5,627,567 A * | 5/1997 | Davidson | 345/173 |
| 6,073,036 A * | 6/2000 | Heikkinen et al. | 455/550.1 |
| 7,443,316 B2 * | 10/2008 | Lim | 341/22 |
| 7,616,191 B2 | 11/2009 | Matta | |
| 7,653,883 B2 | 1/2010 | Hotelling et al. | |
| 8,232,973 B2 * | 7/2012 | Kocienda et al. | 345/173 |
| 8,289,286 B2 * | 10/2012 | Stallings et al. | 345/173 |
| 8,381,118 B2 * | 2/2013 | Minton | 715/773 |

(Continued)

FOREIGN PATENT DOCUMENTS

DE   10 2006 037 156    9/2007
EP          0 880 090   11/1998

(Continued)

*Primary Examiner* — Dismery Mercedes
(74) *Attorney, Agent, or Firm* — Sherr & Jiang, PLLC

(57) ABSTRACT

An information processing apparatus according to the present invention comprises a display unit for displaying thereon a plurality of input regions operated by an operating body, a detection unit for detecting an approach distance between the operating body and a surface of the display unit, and a region control unit for, when the operating body approaches one of the input regions within a predetermined distance, enlarging the input region which the operating body approaches, and moving at least one of the input regions such that the adjacent input regions do not overlap each other. The input region is enlarged and an overlap between the input regions is avoided so that a user can easily select a desired input region, thereby preventing erroneous selection of other input region.

25 Claims, 11 Drawing Sheets

(56) References Cited

U.S. PATENT DOCUMENTS

| | | | |
|---|---|---|---|
| 8,446,384 B2 * | 5/2013 | Miyazaki | 345/173 |
| 2002/0190988 A1 | 12/2002 | Maillot et al. | |
| 2006/0228149 A1 | 10/2006 | Harley | |
| 2006/0232551 A1 * | 10/2006 | Matta | 345/156 |
| 2007/0046641 A1 * | 3/2007 | Lim | 345/173 |
| 2007/0152978 A1 | 7/2007 | Kocienda et al. | |
| 2009/0051661 A1 * | 2/2009 | Kraft et al. | 345/173 |
| 2009/0150785 A1 * | 6/2009 | Asami et al. | 715/727 |
| 2009/0193361 A1 * | 7/2009 | Lee et al. | 715/810 |
| 2009/0231282 A1 | 9/2009 | Fyke | |
| 2009/0289903 A1 | 11/2009 | Chen et al. | |
| 2009/0327977 A1 | 12/2009 | Bachfischer | |
| 2010/0026723 A1 * | 2/2010 | Nishihara et al. | 345/671 |
| 2010/0251161 A1 * | 9/2010 | Fong et al. | 715/773 |
| 2011/0221693 A1 | 9/2011 | Miyazaki | |

FOREIGN PATENT DOCUMENTS

| | | |
|---|---|---|
| JP | 2-136914 | 5/1990 |
| JP | 2-153415 | 6/1990 |
| JP | 5-197471 | 8/1993 |
| JP | 8-234909 | 9/1996 |
| JP | 09-160910 | 6/1997 |
| JP | 10-105153 | 4/1998 |
| JP | 2002-297293 | 10/2002 |
| JP | 2005-352924 | 12/2005 |
| JP | 2006-236143 | 9/2006 |
| JP | 2006236143 A * | 9/2006 |
| JP | 2008-9759 | 1/2008 |
| WO | WO 03/077108 | 9/2003 |
| WO | WO 2009/069392 | 6/2009 |

* cited by examiner

INFORMATION PROCESSING APPARATUS, INFORMATION PROCESSING METHOD AND COMPUTER PROGRAM

CROSS REFERENCE TO PRIOR APPLICATION

This application is a continuation of U.S. patent application Ser. No. 12/558,031, filed Sep. 11, 2009, which is hereby incorporated by reference in its entirety.

BACKGROUND OF THE INVENTION

1. Field of the Invention

The present invention relates to an information processing apparatus, information processing method and computer program, and more particularly to an information processing apparatus including an on-screen keyboard, information processing method and computer program.

2. Description of the Related Art

Since a touch sensor can realize an intuitive and user-friendly user interface, it has been used in ticketing machines in transportation facilities or ATMs in banks in related art. In recent years, the touch sensor can detect a user' operation, thereby realizing device operations which have not been found in button operations in related art. Thus, recently, the touch sensor has been widely used in portable devices such as cell phone or game device.

Some devices having a touch panel mounted thereon include not a physical keyboard but an on-screen keyboard as software keyboard by which characters are input from a screen (Japanese Patent Application Laid-Open No. 2002-297293, Japanese Patent Application Laid-Open No. 08-234909, Japanese Patent Application Laid-Open No. 05-197471, Japanese Patent Application Laid-Open No. 02-136914, and Japanese Patent Application Laid-Open No. 2008-9759, for example). There was an issue in the on-screen keyboard that a user can easily input characters while the keys are blocked by a user's finger. A solution for recognizing a user-focusing key is conducted against the above issue. For example, in Japanese Patent Application Laid-Open No. 2002-297293, Japanese Patent Application Laid-Open No. 08-234909, Japanese Patent Application Laid-Open No. 05-197471, Japanese Patent Application Laid-Open No. 02-136914, and Japanese Patent Application Laid-Open No. 2008-9759, there is performed a processing in which a user-focusing key and its surrounding keys are enlarged in size and the focused key is offset to be displayed outside a finger-blocking region.

SUMMARY OF THE INVENTION

However, there was an issue that an enlargement of key causes adjacent keys to block each other in the key enlargement processing. Further, in a key movement processing, a user moves his/her finger on a screen while touching a key, and then moves the finger away from the screen after confirming the display, thereby fixing the key. However, when the user-touched position is on the user-intended key, the user can perform a tap operation to fix the key, but when the user-touched position is not on the user-intended key, the user has to move the finger onto the intended key. This is because once the user moves a finger away from the screen, the operation on the presently-focused key is fixed and the user has to perform an operation of canceling the key operation. There is easily assumed that such erroneous key touching is considered to frequently occur, which imposes user's operation load.

The present invention has been therefore made in views of the above issues, and it is desirable to provide a novel and improved information processing apparatus, information processing method and computer program capable of smoothly performing key inputting on an on-screen keyboard.

According to an embodiment of the present invention, there is provided an information processing apparatus including: a display unit for displaying thereon a plurality of input regions operated by an operating body; a detection unit for detecting an approach distance between the operating body and a surface of the display unit; and a region control unit for, when the operating body approaches one of the input regions within a predetermined distance, enlarging the input region which the operating body approaches, and moving at least one of the input regions such that the adjacent input regions do not overlap each other.

According to the present invention, when the detection unit detects an approach or contact between the operating body and the display unit, the region control unit enlarges the operating body-approaching or -contacting input region. At least one of the input regions is moved along with the enlargement such that adjacent input regions do not overlap each other. As described above, the input region is enlarged and the overlap between the input regions is avoided so that the user can easily select a his/her desired input region, thereby preventing erroneous selection of other input region.

The region control unit can include: a size decision unit for deciding a size of the input region after being changed depending on the approach distance of the operating body; and an ideal position calculation unit for calculating an ideal position where the adjacent input regions having a changed size do not overlap each other.

Further, the ideal position calculation unit may include: an overlap avoidance region decision unit for deciding an overlap avoidance region for avoiding an overlap with the other input regions in the input region having a changed size; a pair decision unit for deciding a pair of the adjacent input regions; an ideal relative position decision unit for deciding an ideal relative position where the corresponding overlap avoidance regions do not overlap each other for the pair of input regions; and an ideal position decision unit for minimizing a difference between a present relative position of the corresponding overlap avoidance region and the ideal relative position and calculating the ideal position.

The ideal relative position decision unit, when a present position of the overlap avoidance region corresponding to the paired input region does not overlap, can assume the present position of the overlap avoidance region as the ideal relative position, and when the present position of the overlap avoidance region corresponding to the paired input region overlaps, assume the position to which one of the overlap avoidance regions is moved in a reference line direction connecting the centers of the overlap avoidance regions so as not to overlap the other overlap avoidance region as the ideal relative position.

Further, the size decision unit may optimize an enlargement factor of the input regions such that all the input regions are within a predetermined range.

Furthermore, the information processing apparatus according to the present invention can further include a prediction unit for predicting input information to be input by a user. At this time, the region control unit may change a display of the input region based on predictive input information as the input information predicted by the prediction unit.

The prediction unit can analyze already-input information already input from the input regions and predict the input region to be operated next for inputting the predictive input information as a subsequently-operated region. At this time, the region control unit changes a display of the predicted subsequently-operated region.

According to another embodiment of the present invention, there is provided an information processing method including the steps of: displaying a plurality of input regions operated by an operating body on a display unit; detecting an approach distance between the operating body and a surface of the display unit; and when the operating body approaches one of the input regions within a predetermined distance, enlarging the input region which the operating body approaches, and moving at least one of the input regions such that the adjacent input regions do not overlap each other.

Further, the region control step may include the steps of: deciding a size of the input region changed depending on the approach distance of the operating body; and calculating an ideal position where the adjacent input regions having a changed size do not overlap each other.

Further, the ideal position calculating step can include the steps of: deciding an overlap avoidance region where an overlap with the other input region is avoided for the changed size of the input region; deciding a pair of the adjacent input regions; deciding an ideal relative position where the corresponding overlap avoidance regions do not overlap each other for the pair of input regions; and minimizing a difference between a present relative position of the corresponding overlap avoidance region and the ideal relative position and calculating the ideal position.

The ideal relative position deciding step, when a present position of the overlap avoidance region corresponding to the paired input region does not overlap, may assume the present position of the overlap avoidance region as the ideal relative position, and when the present position of the overlap avoidance region corresponding to the paired input region overlaps, may assume the position to which one of the overlap avoidance regions is moved in a reference line direction connecting the centers of the overlap avoidance regions so as not to overlap the other overlap avoidance region as the ideal relative position.

Further, the size deciding step may optimize an enlargement factor of the input regions such that all the input regions are within a predetermined range.

Furthermore, the information processing method according to the present invention can include a step of predicting input information to be input by a user. Here, the region control step may change a display of the input region based on predictive input information as the predicted input information.

Further, the predicting step may analyze already-input information already input from the input regions and predict the input region to be operated next for inputting the predictive input information as a subsequently-operated region. At this time, the region control step can change a display of the predicted subsequently-operated region.

According to another embodiment of the present invention, there is provided a computer program for causing a computer to function as the information processing apparatus. The computer program is stored in a storage device included in the computer, and is read and executed by the CPU included in the computer, thereby causing the computer to function as the information processing apparatus. Further, there is also provided a computer readable recording medium in which the computer program is recorded. The recording medium is a magnetic disc, optical disc, MO (Magneto Optical) disc and the like, for example. Examples of the magnetic disc include a hard disc, a disc-shaped magnetic disc and the like. Further, examples of the optical disc include a CD (Compact Disc), DVD-R (Digital Versatile Disc Recordable), BD (Blu-Ray Disc (registered trademark)) and the like.

According to the embodiments of the present invention, there can be provided an information processing apparatus, information processing method and computer program capable of smoothly performing key inputting on the on-screen keyboard.

DETAILED DESCRIPTION OF THE PREFERRED EMBODIMENTS

Figure 1:
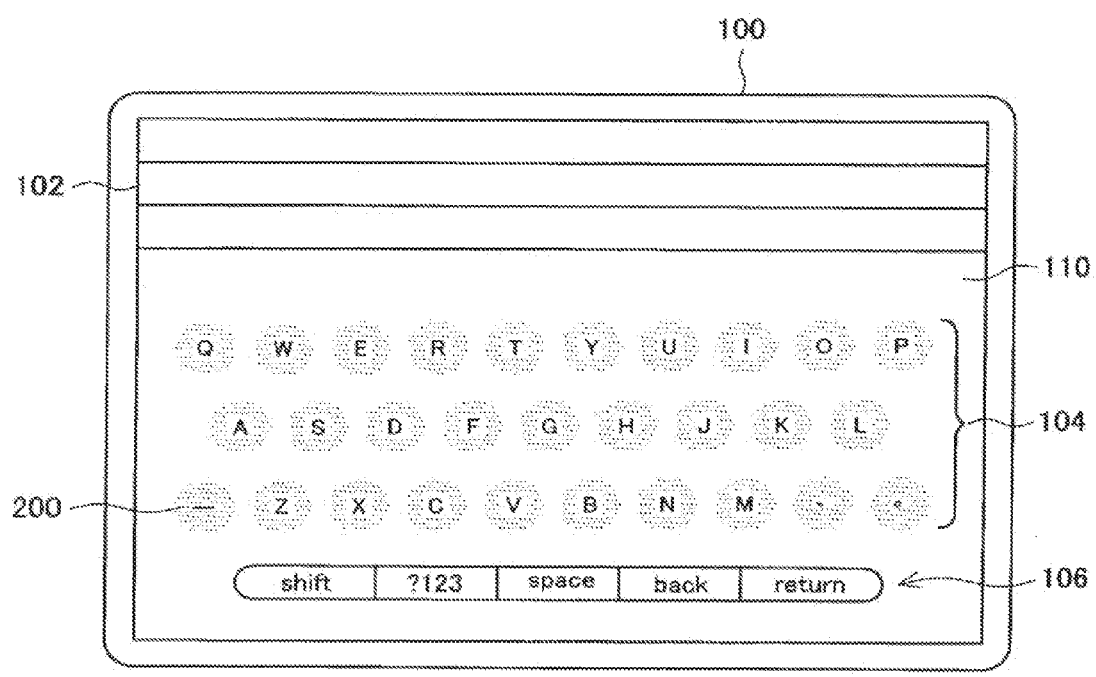
FIG. 1 is a plan view showing a schematic configuration of an information processing apparatus according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

Figure 2:
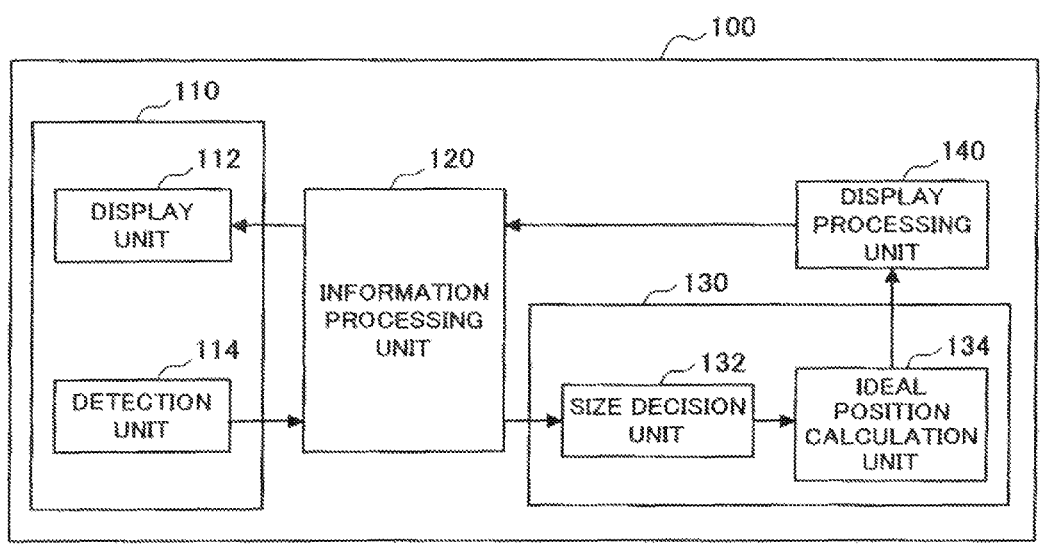
FIG. 2 is a block diagram showing a functional configuration of the information processing apparatus according to the first embodiment.

At first, a schematic configuration of an information processing apparatus 100 according to a first embodiment of the present invention will be described with reference to FIGS. 1 and 2. FIG. 1 is a plan view showing the schematic configuration of the information processing apparatus 100 according to the present embodiment. FIG. 2 is a block diagram showing a functional configuration of the information processing apparatus 100 according to the present embodiment.

<Configuration of Information Processing Apparatus>

The information processing apparatus 100 according to the present embodiment includes a display panel 110 having a touch panel mounted thereon, and is used for ATM in a bank, or portable device such as PDA, cell phone or MP3 player, for example. The display panel 110 according to the present embodiment includes a display unit (reference numeral 112 in FIG. 2) and a detection unit (reference numeral 114 in FIG. 2) for detection an operation on the display unit. The display unit of the display panel 110 displays thereon an input display unit 102 on which input characters are displayed, a key input unit 104 made of several keys for inputting characters such as alphabets or symbols, and a fixed input unit 106 such as input keys or decision key as shown in FIG. 1, for example.

When a user inputs a character from the information processing apparatus 100 including such an on-screen keyboard, the user contacts a key position corresponding to a character to be input by his/her finger or the like. At this time, when a finger's approach or contact to the display unit within a predetermined distance is detected by the detection unit for detecting key inputting, the character is determined to have been input and is displayed on the input display unit 102. The functional configuration of the information processing apparatus 100 according to the present embodiment will be described below in detail.

The information processing apparatus 100 according to the present embodiment includes the display panel 110, an information processing unit 120, a region control unit 130 and a display processing unit 140 as shown in FIG. 2.

The display panel 110 is a function unit which detects an operating body such as user's finger or hand and receives a user's operation, and includes the display unit 112 and the detection unit 114 as described above. The display unit 112 is, for example, a liquid crystal display, and is driven and controlled by the display processing unit 140 through the information processing unit 120. The display unit 112 displays thereon an on-screen keyboard as shown in FIG. 1 or characters input through the keyboard. The detection unit 114 detects an input operation onto the on-screen keyboard displayed on the display unit 112. The display panel 110 according to the present embodiment includes an optical touch sensor for detecting a change in the amount of light (darkness of shadow) to detect an approach of the operating body. At this time, the detection unit 114 can integrally provide one set of three pixels such as red, green and blue as a light reception unit into the display panel 110. The detection unit 114 converts a received light into an electric signal and transmits the electric signal to the information processing unit 120.

The information processing unit 120 is a driver for processing information exchanged between the display panel 110 and the region control unit 130 or the display processing unit 140. The information processing unit 120 calculates an approach position of the operating body based on the electric signal received from the detection unit 114, and transmits the calculated position as approach position information to the region control unit 130. The approach position information is expressed in a three-dimensional coordinate with the center of the display unit 112 as the origin, for example. Further, the information processing unit 120 receives display drive information for displaying the changed display contents from the display processing unit 140 to the display unit 112, and transmits it to the display unit 112.

The region control unit 130 calculates a size and a display position of a key to be displayed on the display unit 112 based on the approach position information of the operating body. The region control unit 130 includes a size decision unit 132 and an ideal position calculation unit 134, for example.

The size decision unit 132 decides the size of the input key based on the approach potion information received from the information processing unit 120. In the information processing apparatus 100 according to the present embodiment, the size of an operating body-approaching key and the size of surrounding keys thereof are enlarged than a typically-displayed basic size, thereby preventing the keys from being blocked by the operating body. When deciding the size of the key based on the approach position information, the size decision unit 132 transmits the changed size of the key to the ideal position calculation unit 134.

The ideal position calculation unit 134 performs a processing of avoiding an overlap between the size-changed keys. The ideal position calculation unit 134 decides an overlap avoidance region for avoiding an overlap with other keys in terms of the changed size of the keys. Further, the ideal position calculation unit 134 decides a pair of mutually adjacent keys and decides an ideal relative position where the paired keys do not overlap each other. The ideal position calculation unit 134 minimize a difference between the relative position of the current pair of keys and the ideal relative position, and calculates an ideal position where the overlap between keys is entirely avoided. The ideal position calculation unit 134 transmits position information on the calculated ideal position to the display processing unit 140. The position information on the ideal position can be also expressed in the three-dimensional coordinate with the center of the display unit 112 as the origin, for example.

The display processing unit 140 processes the display drive information for displaying the calculated ideal position on the ideal position calculation unit 134. The display processing unit 140 generates and transmits the display drive information on the display unit 112 for displaying an ideal position to the information processing unit 120. The region control unit 130 and the display processing unit 140 can be configured as an application program for controlling the information processing apparatus 100.

Figure 3:
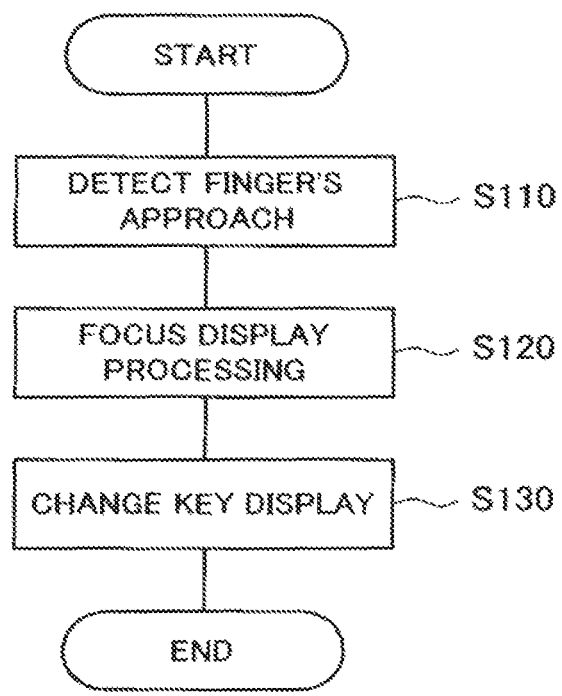
FIG. 3 is a flowchart showing a display processing method of the information processing apparatus according to the first embodiment.
Figure 4:
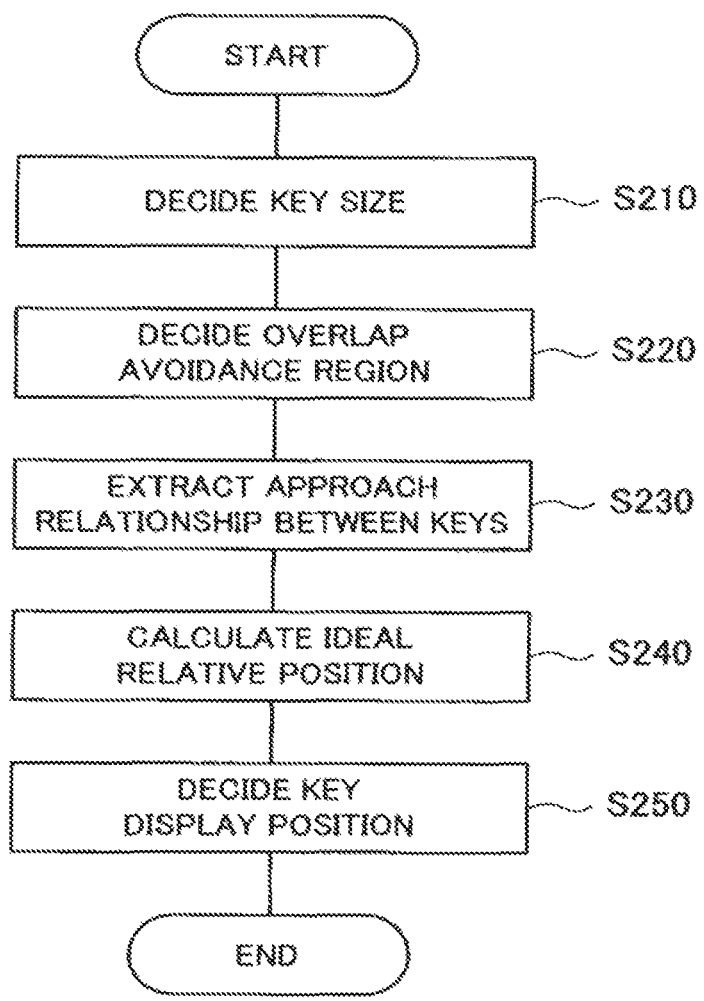
FIG. 4 is a flowchart showing a focus display processing according to the first embodiment.

The configuration of the information processing apparatus 100 according to the present embodiment has been described above. The information processing apparatus 100 enlarges a key corresponding to a character to be input and its surrounding keys in size and changes the key display position to avoid an overlap between enlarged keys in order to make user's key inputting smooth. A display processing method of the information processing apparatus 100 according to the present embodiment will be described below with reference to FIGS. 3 and 4. FIG. 3 is a flowchart showing the display processing method of the information processing apparatus 100 according to the present embodiment. FIG. 4 is a flowchart showing a focus display processing according to the present embodiment.

<Key Display Processing Method>

At first, the display processing method according to the present embodiment will be described with reference to FIG. 3. The information processing apparatus 100 according to the present embodiment detects an approach of an operating body such as user's finger or hand by the detection unit 114 and then starts a processing of changing the display contents of the key input unit 104 (step S110). The detection unit 114 can detect an approach distance of the operating body based on a change in the amount of received light as described above. When the operating body approaches the display unit 112, the amount of light detected by the detection unit 114 provided at the approach position decreases. The detection unit 114 converts the detected amount of light into an electric signal and transmits the signal to the information processing unit 120. The information processing unit 120 specifies a position (approach position) of the key focused by the operating body through the received electric signal.

Next, when it is determined that the operating body is approaching the display unit 112 within a predetermined distance, there is performed a focus display processing of enlarging a focused key in size and displaying keys not to overlap each other on the key input unit 104 (step S120). The focus display processing is performed to change the display contents on the key input unit 104, thereby making user's key inputting smooth and preventing erroneous key touching. The focus display processing will be described below in detail.

When the changed display position is decided by the focus display processing, the key is displayed on the changed display position (step S130). The display processing unit 140 generates the display drive information for changing the display positions of the keys of the key input unit 104, and drives and controls the display unit 112 based on the display drive information.

In this manner, when an approach or contact of the operating body to the display unit 112 is detected, the information processing apparatus 100 according to the present embodiment performs the focus display processing to display a key to be focused in an enlarged manner and to display the key at the position where the overlap between keys is avoided. The focus display processing according to the present embodiment will be described below in detail with reference to FIG. 4.

<Focus Display Processing>

The focus display processing according to the present embodiment decides the changed size of the key at first as shown in FIG. 4 (step S210). The size decision unit 132 sets a key (focused key) at an operating body-approaching position and its surrounding keys to be larger than the typical basic size. For example, the size of the focused key is set to be about four times the basic size, the size of the surrounding keys is set to be about twice the basic size, and the size of other keys is set at the basic size. In this manner, the size decision unit 132 decides the changed size of the keys. The keys positioned around the focused key can be assumed to be adjacent to the focused key, for example. The key shape may be changed to be similar between before and after the change, or to be different between before and after the change. The position and size of the fixed input unit 106 such as input key or decision key is assumed to be unchanged.

Next, the ideal position calculation unit 134 decides an overlap avoidance region where an overlap between keys is avoided (step S220). The overlap avoidance region is provided for each key as a region where an overlap with other keys is desired to be avoided as much as possible. The overlap avoidance region is decided based on the changed size of the key decided in step S210, for example, and can be assumed as a region including the region of the changed key.

Figure 5:
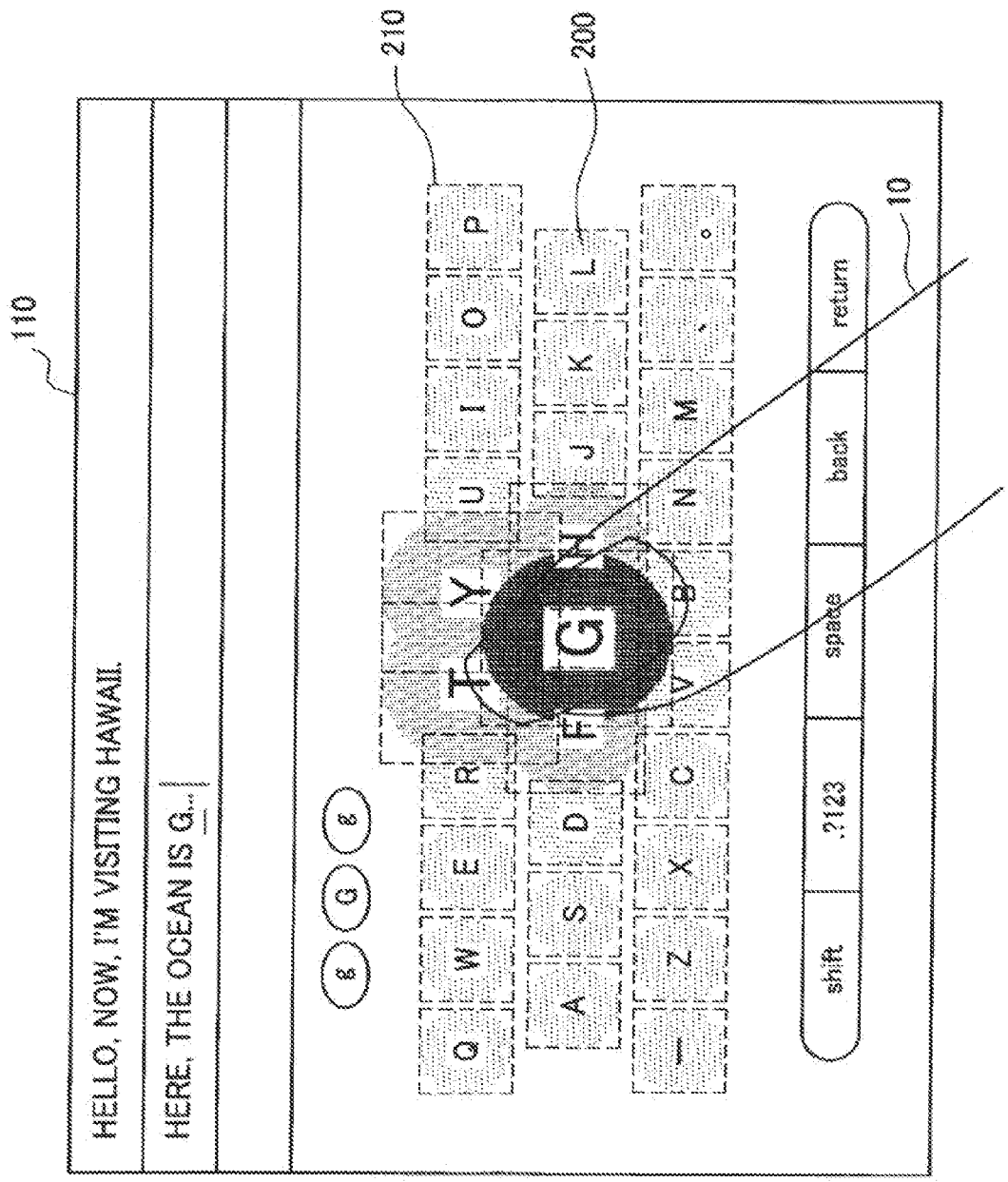
FIG. 5 is an explanatory diagram showing a state of a display panel when a processing in step S210 or S220 is performed.

FIG. 5 shows a state of the display panel 110 when a processing in step S210 or S220 is performed. As shown in FIG. 5, a plurality of substantially circular keys 200 are arranged on the display panel 110. There is assumed such that the user's finger 10 as operating body approaches the display panel 110 and the maximum approach to the alphabet "G" is detected. At this time, the alphabet "G" is set at about four times the basic size, its surrounding keys 200 are set at about twice the basic size and the other keys 200 remain at the basic size.

When the changed size of the keys 200 is decided, the overlap avoidance region 210 of each key 200 is decided. In the example, the overlap avoidance region 210 is set as a minimum rectangle including the regions of the substantially circular keys 200 being changed. The overlap avoidance region 210 may be square or rectangular, or circular.

Figure 6:
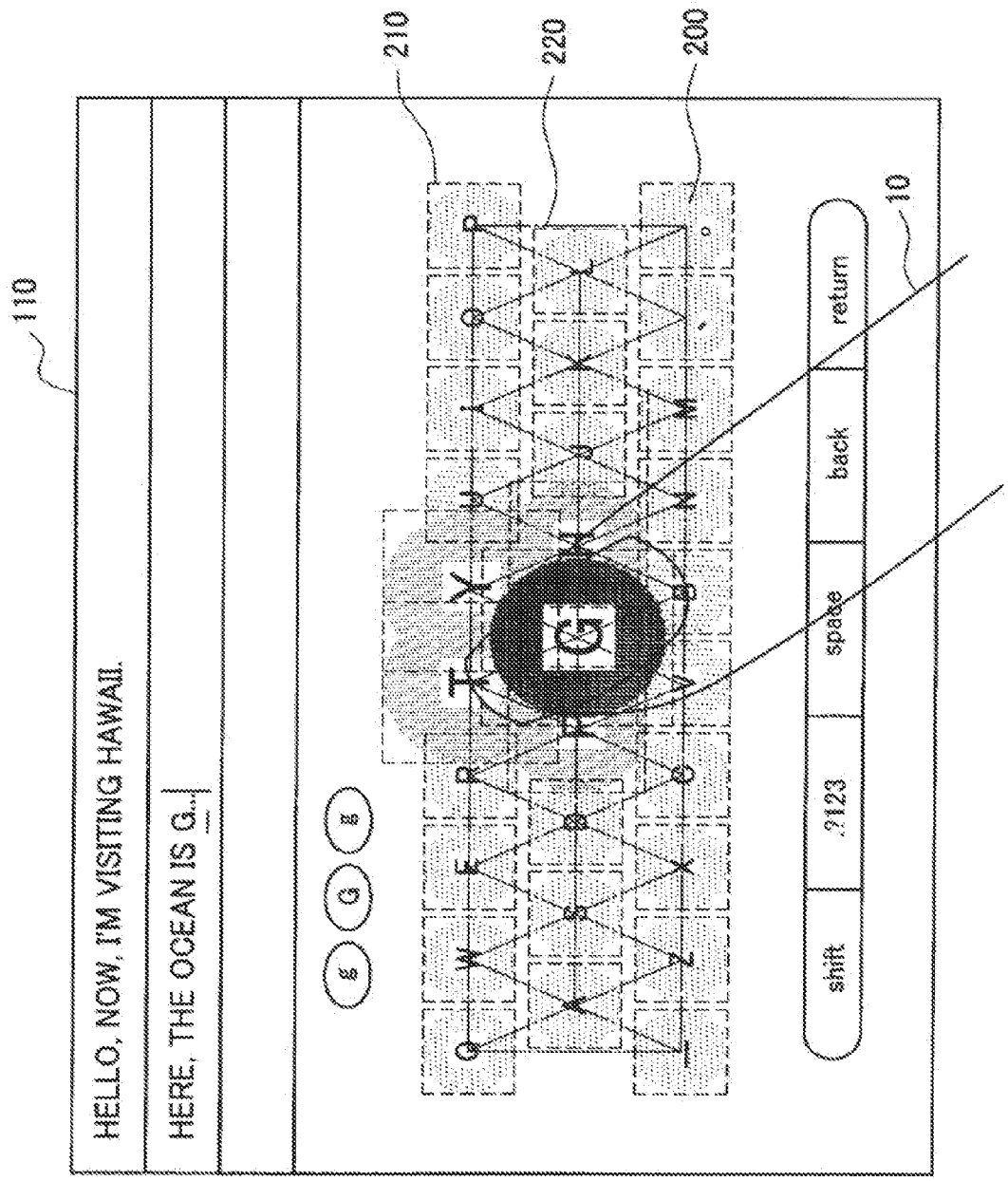
FIG. 6 is an explanatory diagram showing a state of the display panel when a processing in step S230 is performed.

The overlap avoidance processing is performed for displaying the overlap avoidance region 210 of each key not to be overlapped. At first, the information processing unit 120 extracts an approach relationship between keys (step S230). Step S230 is performed as a preprocessing for calculating an ideal relative position for avoiding an overlap between adjacent keys. In the present embodiment, the information processing unit 120 performs Delaunay triangulation with the centers of the overlap avoidance regions 210 as a group of input points, for example, and extracts the approach relationship between keys. The Delaunay triangulation is performed so that a key 200 being approached can be recognized more rapidly. A Delaunay side 220 defined by the processing is as shown in FIG. 6.

Figure 7:
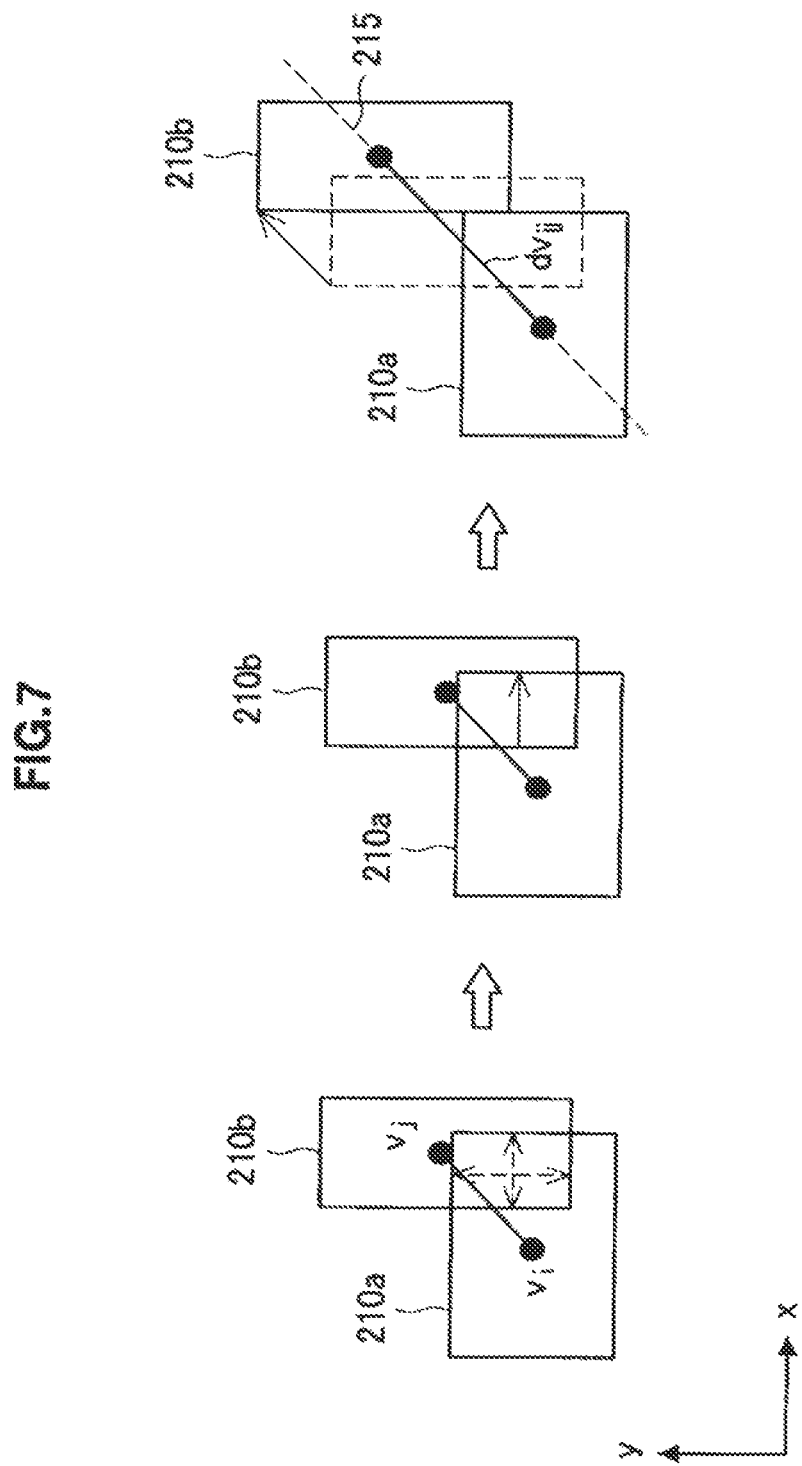
FIG. 7 is an explanatory diagram showing one example of an ideal relative position calculation method.

Next, the ideal relative position is calculated (step S240). In step S240, in a pair of overlap avoidance regions connected by the Delaunay sides 220 calculated in step S230, an ideal relative position where the overlap is not present is calculated. One example of the ideal relative position calculation method will be described with reference to FIG. 7. FIG. 7 is an explanatory diagram showing one example of the ideal relative position calculation method, where only one pair of overlap avoidance regions 210*a* and 2100*b* is illustrated for convenient explanation.

The left diagram in FIG. 7 shows the overlap avoidance regions 210*a* and 210*b* at present (before changing the display region). The center position of the overlap avoidance region 210*a* is assumed as $v_i$ and the center position of the overlap avoidance region 210*b* is assumed as $v_j$. When the overlap avoidance regions 210*a* and 210*b* overlap each other, the center positions $v_i$ and $v_j$ of the overlap avoidance regions 210*a* and 210*b* are connected to decide a reference line 215. Next, as illustrated in the center diagram in FIG. 7, one overlap avoidance region (the overlap avoidance region 210*b* in FIG. 7) is moved in parallel along with the reference line 215 until an overlap with the other overlap avoidance region (the overlap avoidance region 210*a* in FIG. 7) is eliminated. Thus, the positions of the keys 200 can be changed without changing the relative direction of adjacent keys 200.

Then, a position where the overlap between the two overlap avoidance regions 210*a* and 210*b* is eliminated, which is illustrated in the right diagram in FIG. 7, can be assumed as the ideal relative position. The length of the overlapped portion in the xy direction may be set such that each overlap avoidance region 210*a*, 210*b* can move at the shortest distance. On the other hand, when the overlap avoidance regions 210*a* and 210*b* do not overlap each other, the present position may be assumed as the ideal relative position.

When the ideal relative position is calculated, a difference between the present relative position and the ideal relative position is minimized. The minimizing processing may employ the least square method, for example. At this time, the center of the screen is assumed as the center of gravity of the entire overlap avoidance regions 210, thereby fixing the display region. The processing of minimizing the difference between the present relative position and the ideal relative position can be performed by the following Formula 1:

$$v_{i_{new}} = \arg\min\left\{\sum_{i,j}|(v_i - v_j) - dv_{ij}|^2 + \left|\left(\frac{1}{n}\sum_i v_i\right) - c\right|^2\right\} \quad \text{[Formula 1]}$$

where $v_i$ and $v_j$ are the respective center positions of a pair of overlap avoidance regions 210 and correspond to the start point and the end point of the Delaunay side, respectively. $dv_{ij}$ denotes an ideal relative position of $v_i$ relative to $v_j$. n denotes the number of apexes constituting the Delaunay side, that is the number of overlap avoidance regions. c is the center of gravity of the entire overlap avoidance regions and in the present embodiment is the center coordinate of the screen of the display unit 112. In this manner, each position of $v_i$ for minimizing the calculated value is calculated by Formula 1. In the present embodiment, the processing in Formula 1 is performed only once for speeding up the processing, which does not ensure that the keys do not completely overlap each other. Thus, in order to completely eliminate an overlap between keys, the processing may be performed several times, thereby enhancing the accuracy of the changed position.

Then, the ideal position $v_{i_{new}}$ to which each overlap avoidance region 210 is moved is decided and displayed on the display panel 110 (step S250). In this manner, the focus display processing according to the present embodiment is performed so that a key near a user's finger is enlarged to be displayed but the surrounding keys of the key to be enlarged enlarge their key size while moving in parallel to avoid an overlap. Then, a key away from the finger may hold its basic position and basic size.

Figure 8:
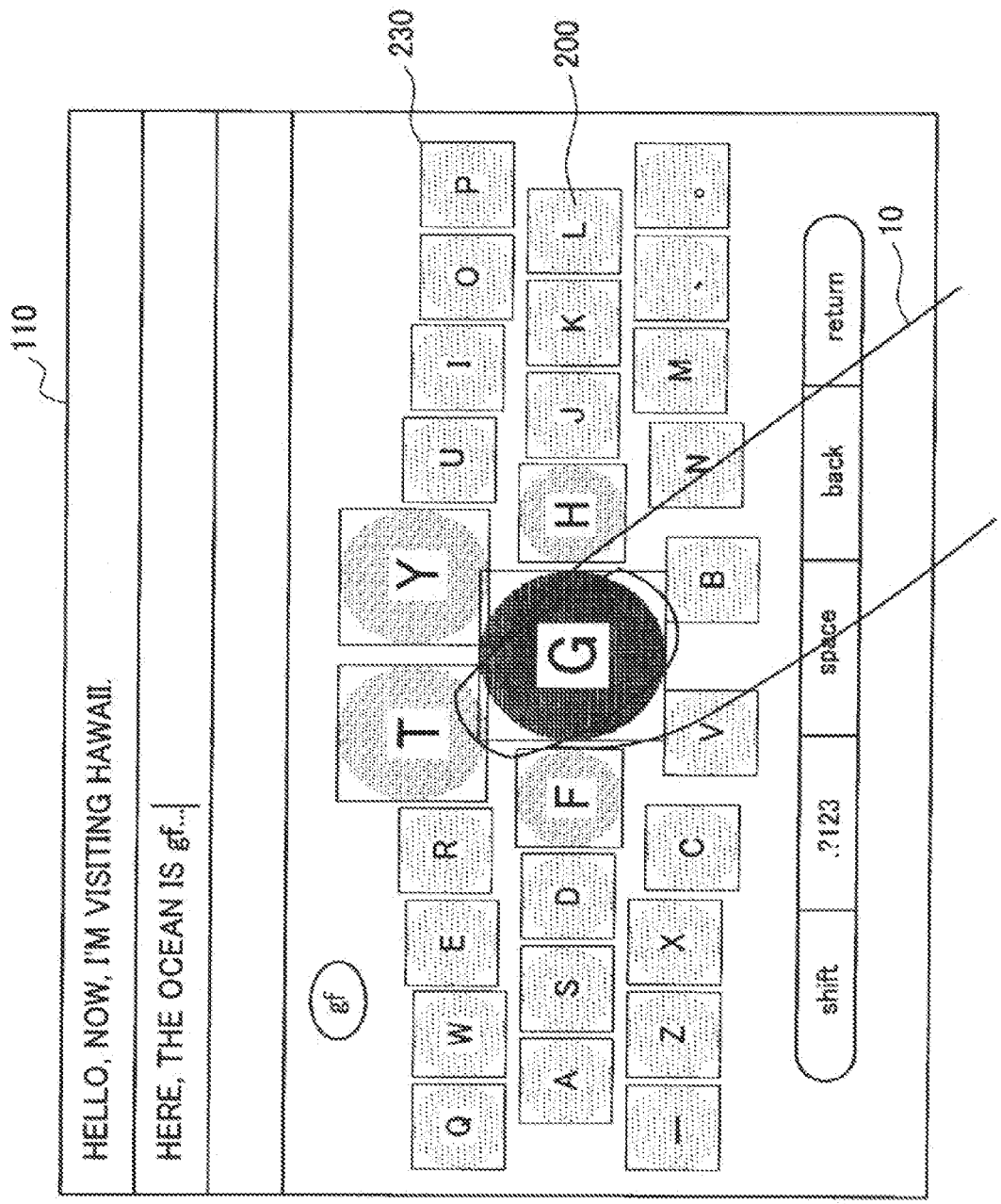
FIG. 8 is an explanatory diagram showing a state of the display panel when a processing in step S240 is performed.

FIG. 8 shows a state of the display panel 110 when a processing in step S240 is performed. As shown in FIG. 8, in the ideal position 230 which is a position in the overlap avoidance region of the changed key calculated by Formula 1, the focused key is enlarged as compared with in the present position of the overlap avoidance region 210 and its surrounding keys take positions away from the enlarged key.

Figure 9:
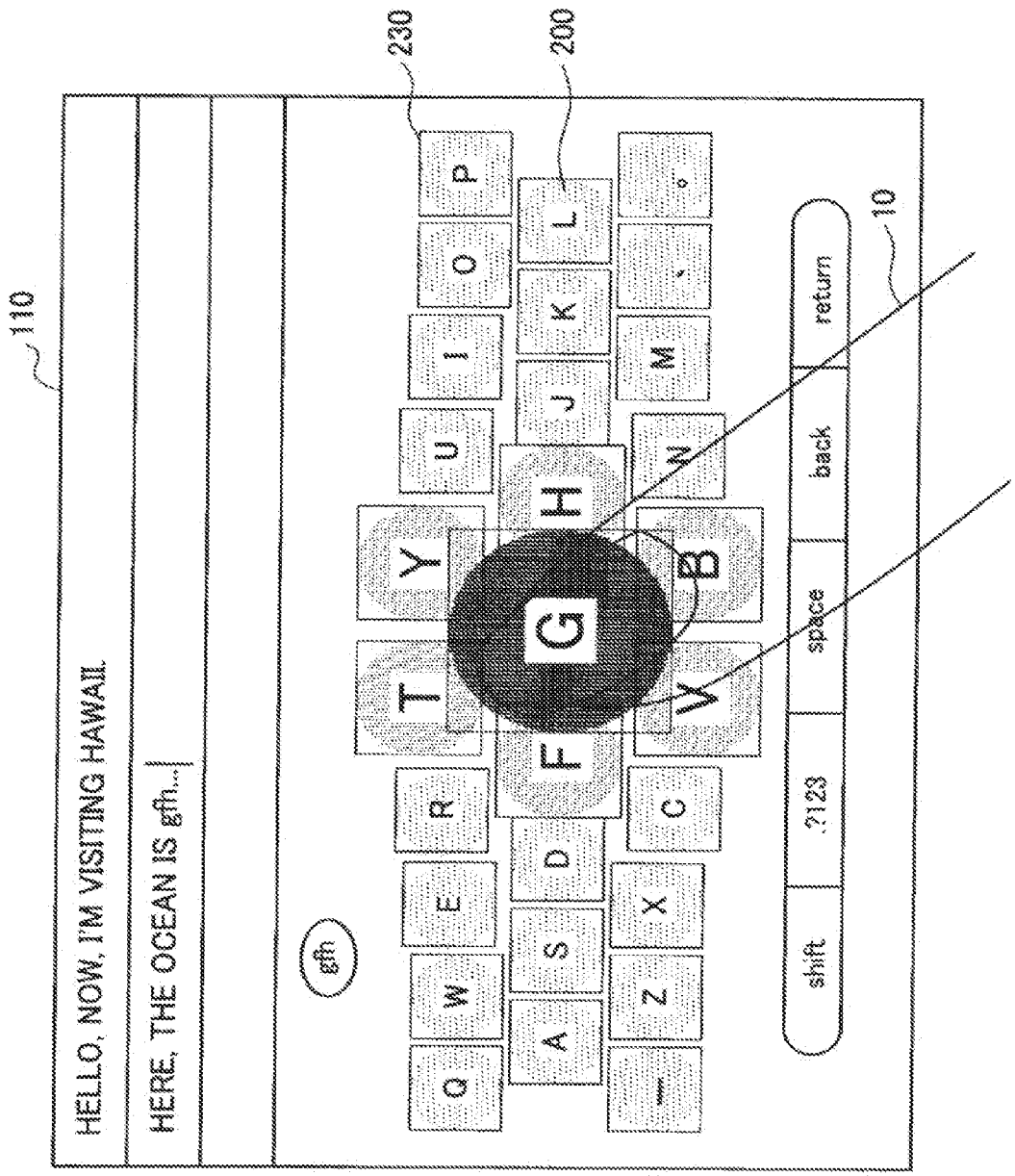
FIG. 9 is an explanatory diagram showing one example of a size and arrangement of keys when a focus display processing according to the first embodiment is performed.

Thereafter, when the user's finger 10 further approaches and contacts the display panel 110 from the position shown in FIG. 8, the size of the focused alphabet "G" key is further enlarged as compared with before the contact of the user's finger 10 as shown in FIG. 9, for example. At this time, the surrounding keys of the alphabet "G" key are made smaller as compared with FIG. 8. Thus, the key through which the user inputs is easier to input, thereby preventing erroneous touching of other keys.

Figure 10:
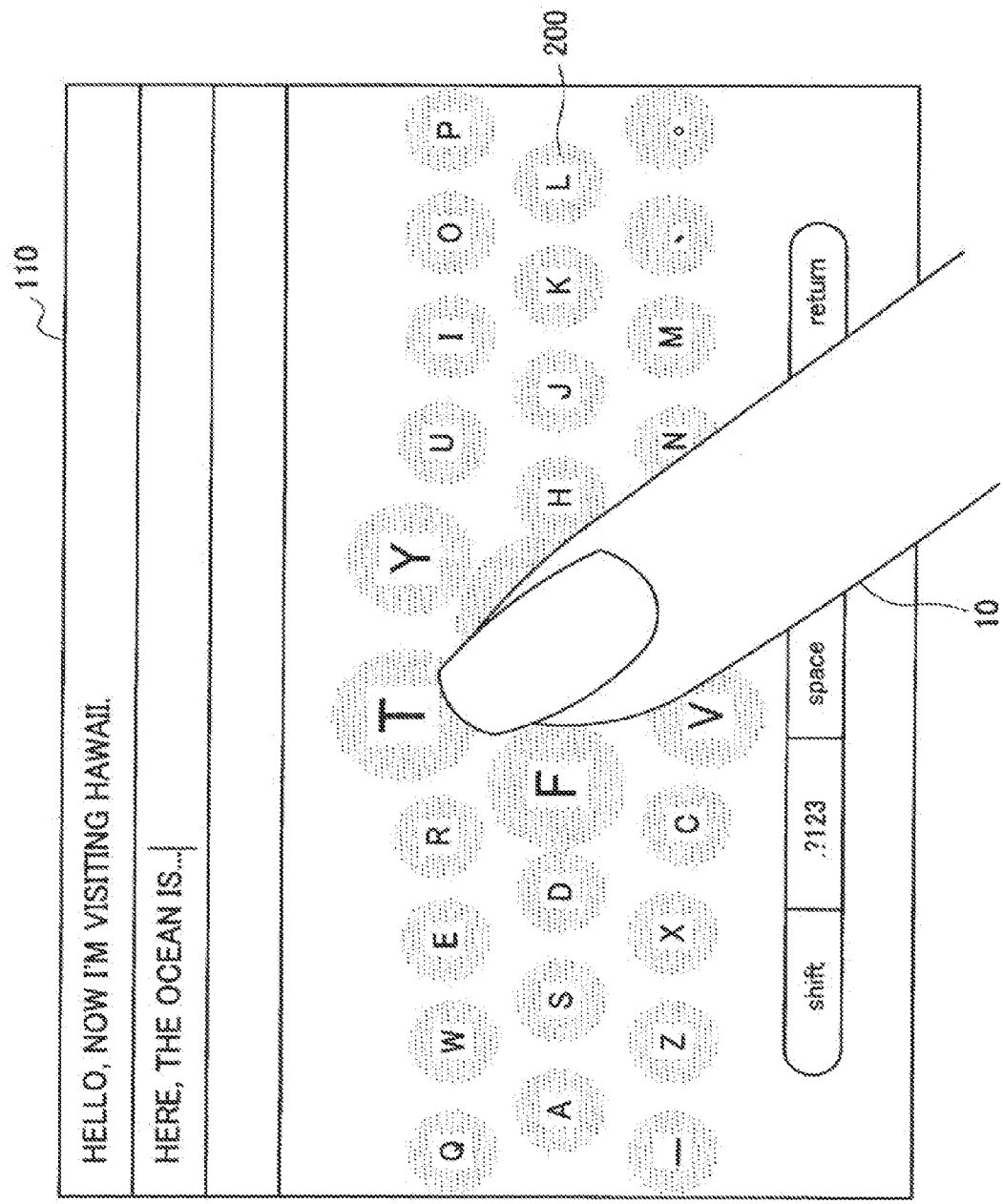
FIG. 10 is an explanatory diagram showing another example of the size and arrangement of the keys when the focus display processing according to the first embodiment is performed.

There is assumed that the user moves the finger 10 to the alphabet "T" while contacting the finger 10 on the display panel 110. At this time, the information processing apparatus 100 can detect the direction of the finger 10 as the operating body by the detection unit 114 of the display panel 110 and enlarge the key size of a key having a high possibility of being touched. For example, the information processing apparatus 100 enlarges the size of the alphabets "T", "F" and "Y" positioned in the finger-moving direction as shown in FIG. 10 as compared with the state of FIG. 9. The key size of the alphabets "B", "V" and "H" positioned opposite to the finger moving direction and the key size of the alphabet "G" on which the finger 10 is placed are reduced as compared with the state of FIG. 9. Thus, the keys having a high possibility of being touched by the user are easier to touch while the keys having a low possibility of being touched are prevented from being erroneously operated.

The information processing apparatus 100 according to the first embodiment and the key display processing method using the same have been described above. According to the present embodiment, a focused key and its surrounding keys on the display unit 112 which the operating body approaches or contacts are enlarged in the display size and each key is displayed at the position where an overlap between keys is avoided. Thus, user's key inputting can be performed smoothly.

In step S210, an enlargement factor of individual key may be optimized such that the entire area of the key input unit 104 is not changed. For example, the keys away from the focused key are displayed to be smaller than the basic size so that the keys 200 of the key input unit 104 are adjusted to be within a predetermined display region. Thus, also when the number of keys to be enlarged through multipoint input is increased, the entire key input unit 104 can be displayed not to be offset from the display region on the display panel 110.

Second Embodiment

Figure 11:
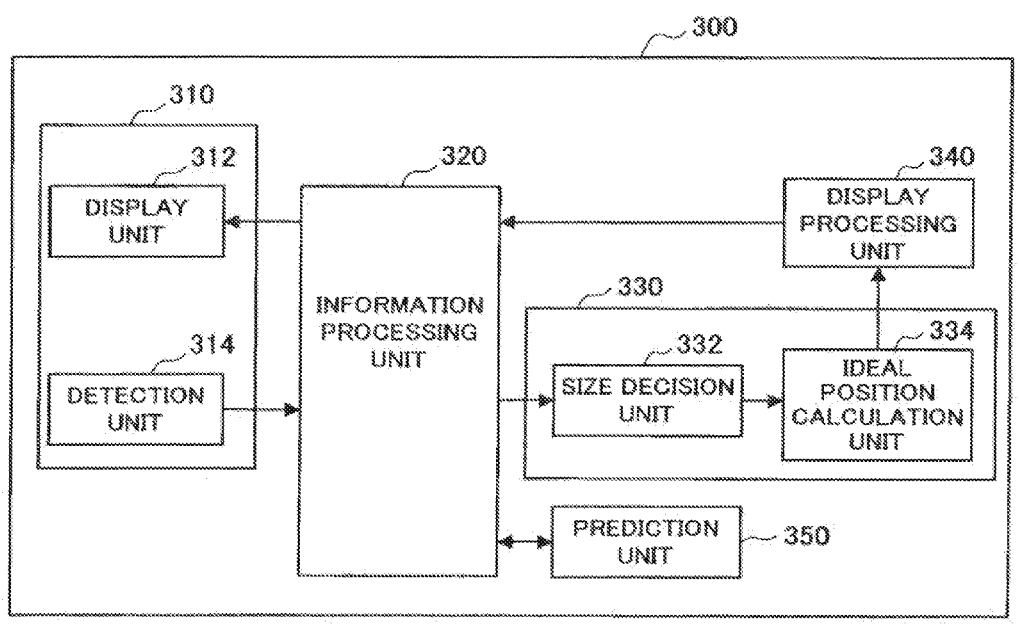
FIG. 11 is a block diagram showing a functional configuration of an information processing apparatus according to a second embodiment of the present invention.

Next, an information processing apparatus 300 according to a second embodiment of the present invention will be described with reference to FIG. 11. The information processing apparatus 300 according to the present embodiment is different from the information processing apparatus 100 according to the first embodiment in that it includes a prediction unit 350 for predicting input information. The configuration and processing of the information processing apparatus 300 according to the present embodiment will be described mainly based on the difference with the first embodiment with reference to FIG. 11. FIG. 11 is a block diagram showing a functional configuration of the information processing apparatus 300 according to the present embodiment.

<Configuration of Information Processing Apparatus>

The information processing apparatus 300 according to the present embodiment includes a display panel 310 having a display unit 312 and a detection unit 314, an information processing unit 320, a region control unit 330 having a size decision unit 332 and an ideal position calculation unit 334, a display processing unit 340 and the prediction unit 350 as shown in FIG. 11. The display panel 310, the information processing unit 320, the region control unit 330 and the display processing unit 340 have the similar functions and configurations to those of the display panel 110, the information processing unit 120, the region control unit 130 and the display processing unit 140 according to the first embodiment, respectively. Thus, the explanation thereof will be omitted.

The prediction unit 350 is a function unit for predicting input information to be input by the user. When an approach or contact of the operating body to the display panel 310 is detected by the detection unit 314, the prediction unit 350 predicts a word to be input from the already-input characters, and automatically generates one or several candidate character strings (predictive input information). Then, the prediction unit 350 analyzes the readings of the candidate character strings and transmits the analysis result via the information processing unit 320 to the region control unit 330.

<Application to Predictive Conversion Function>

The information processing apparatus 300 according to the present embodiment can predict a word to be input by the prediction unit 350 from a character to be input by the user. The predictive conversion processing can be performed by using an existing method. The prediction unit 350 further analyzes a reading of a predicted word and obtains a character to be input next for each candidate character string. The character to be input next is directed for narrowing the candidate character strings. The prediction unit 350 transmits the obtained character via the information processing unit 320 to the region control unit 330.

The region control unit 330 which has received the candidates of the character to be input next decides the changed size of the key by the size decision unit 332 at first. For example, the key size of the character to be input next is enlarged than the basic size and the size of other characters remain at the basic size. Then, the ideal position calculation unit 334 decides an overlap avoidance region where an overlap between keys is avoided. The overlap avoidance region can be decided based on the changed size of the key decided by the size decision unit 332 similarly to the first embodiment, and can be assumed as a region including a region of the changed key, for example.

Further, in order to display an overlap avoidance region of each key in a non-overlapped manner, after the approach relationship between keys is extracted, the ideal relative position is calculated. When a pair of overlap avoidance regions is decided from the approach relationship between keys, the ideal relative position where the two overlap avoidance regions do not overlap each other is calculated for each pair. The processing can be performed similarly to the first embodiment. When the ideal relative position is calculated, the above Formula 1 is used, for example, to minimize the difference between the present relative position and the ideal relative position. The position (ideal position) of each moved key can be calculated in this manner.

As described above, the focus display processing described in the first embodiment is applied to the predictive conversion function so that the key of a character to be input next for a candidate character string is displayed in an enlarged manner and its surrounding keys are displayed at the basic size. The surrounding keys are displayed not to overlap the key to be touched next. Thus, the key to be touched next by the user is easy to touch, and the candidate character strings can be smoothly narrowed.

The information processing apparatus 300 according to the present embodiment performs the enlargement of keys and the avoidance of overlap to make key inputting smooth but can induce the key to be touched next to the user by a difference in color between the key to be touched next and other keys. Further, the information processing apparatus 300 displays one or several candidate character strings of the predicted word on the display unit 312 of the key display panel 310 so that the user can select the candidate character string.

In the above embodiments, the display panel includes an optical touch sensor for detecting an approach or contact of the operating body, but the present invention is not limited to the example. For example, an approach or contact of the operating body can be detected by using a typical capacitance touch sensor or resistive film touch sensor, for example. In a personal computer, for example, also when a mouse is used to operate a mouse cursor for key inputting, a distance from the mouse cursor position to each key is calculated, thereby performing the enlargement of the key to be focused and the overlap avoidance processing similarly to the above embodiments.

The display processing on the on-screen keyboard has been described in the above embodiments, but the present invention is not limited thereto. The information processing apparatus according to the above embodiments can be applied to menu selection on a home screen, track selection based on text or image such as jacket photograph in a music player, photograph selection in a photo viewer, thumbnail selection in an animation player, for example. Furthermore, the information processing apparatus according to the above embodiments can be applied to enlarged display of a specific portion and overlap avoidance processing therearound in a map application or Web browser.

The display panel including the display unit and the detection unit is provided together with the region control unit and the display processing unit for performing the key size enlargement and the overlap avoidance processing in the above embodiments, but the present invention is not limited thereto. The display panel can be separately provided from the region control unit and the display processing unit. For example, the key size enlargement and the overlap avoidance processing may be performed in a computer connected to the display panel, or the like.

The present application contains subject matter related to that disclosed in Japanese Priority Patent Application JP 2008-234511 filed in the Japan Patent Office on Sep. 12, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a display control unit configured to control a display to display a plurality of display objects that are each operable by an operating body; and
a detecting unit configured to detect, as an operation interaction upon a select display object selected from the plurality of display objects, at least one of a contact or approach by the operating body upon a surface of the display at a position corresponding to a display location of the select display object,
wherein the display control unit controls the select display object to be displayed as relatively enlarged on the display when the detecting unit detects the operation interaction upon the select display object, and positions each of the plurality of display objects so that adjacent display objects do not overlap one another,
wherein the plurality of display objects comprises a first display object type as a display object which is selected by the operation interaction and relatively enlarged for display on the display, a second display object type as a display object which is moved from an original position prior to the relative enlargement of the display object of the first display object type to a relocation position after the relative enlargement of the display object of the first display object type, and a third display object type as a display object which is not changed from before the relative enlargement of the display object of the first display object to after the relative enlargement of the display object of the first display object type, and
wherein at least one of the display control unit and the detecting unit is implemented via a processor.

2. The information processing apparatus according to claim 1, wherein the display control unit relatively enlarges the select display object by enlarging the select display object relative to other display objects of the plurality of display objects.

3. The information processing apparatus according to claim 1, wherein the display control unit relatively enlarges the select display object by reducing a size of display objects surrounding the select display object.

4. The information processing apparatus according to claim 3, wherein the detecting unit detects as the operation interaction upon the select display object the contact by the operating body upon the surface of the display at the position corresponding to the display location of the select display object.

5. The information processing apparatus according to claim 4, wherein the detected contact is a contact for a predetermined period of time by the operating body upon the surface of the display.

6. The information processing apparatus according to claim 4, wherein the detected contact by the operating body upon the surface of the display is a long tap.

7. The information processing apparatus according to claim 1, wherein the detecting unit detects as the operation interaction upon the select display object the contact by the operating body upon the surface of the display at the position corresponding to the display location of the select display object.

8. The information processing apparatus according to claim 7, wherein the detected contact is a contact for a predetermined period of time by the operating body upon the surface of the display.

9. The information processing apparatus according to claim 7, wherein the detected contact by the operating body upon the surface of the display is a long tap.

10. The information processing apparatus according to claim 1, wherein the plurality of display objects are displayed by the display as a plurality of icons.

11. The information processing apparatus according to claim 1, wherein the display control unit comprises:
a size decision unit configured to decide a size of the plurality of display objects after relative enlargement has been carried out, based on an approach distance of the operating body to the surface of the display; and
an ideal position calculating unit configured to calculate ideal positions of the plurality of display objects where the adjacent display objects do not overlap each other after relative enlargement has been carried out.

12. The information processing apparatus according to claim 11, wherein the ideal position calculating unit comprises:
an overlap avoidance region deciding unit configured to decide an overlap avoidance region that enables any one of the display objects to avoid overlapping any other one of the display objects after relative enlargement has been carried out;
a pair decision unit configured to decide a pair of the adjacent display objects;
an ideal relative position decision unit configured to decide ideal relative positions for the pair of the adjacent display objects so that the corresponding overlap avoidance regions do not overlap; and
an ideal position decision unit configured to calculate the ideal relative positions so as to minimize a difference between present relative positions of the corresponding overlap avoidance regions and the ideal relative positions.

13. An information processing apparatus according to claim 12, wherein the ideal relative position decision unit, when a present position of the overlap avoidance region corresponding to the paired display object does not overlap, assumes the present position of the overlap avoidance region as the ideal relative position, and
when the present position of the overlap avoidance region corresponding to the paired display object overlaps, assumes the position to which one of the overlap avoidance regions is moved in a reference line direction connecting the centers of the overlap avoidance regions so as not to overlap the other overlap avoidance region as the ideal relative position.

14. An information processing apparatus according to claim 11,
wherein the size decision unit is further configured to optimize an enlargement factor of the display objects such that all the display objects are within a predetermined range.

15. The information processing apparatus according to claim 1, further comprising a prediction unit configured to predict input information to be input by a user,
wherein the display control unit changes a display of the display object based on predictive input information as the input information predicted by the prediction unit.

16. The information processing apparatus according to claim 15, wherein the prediction unit analyzes past input information that has already been inputted from the display objects and predicts the display object to be operated next for inputting the predictive input information as a next operation region, and
the display control unit changes a display of the predicted next operation region.

17. The information processing apparatus according to claim 1, wherein display objects adjacent to the select display object are concurrently moved so as to avoid overlap therebetween.

18. The information processing apparatus according to claim 1, wherein the plurality of display objects are displayed by the display to be positioned upon at least one of a home screen, a music player, an image viewer and a web browser.

19. The information processing apparatus according to claim 1, wherein the detecting unit comprises a touch panel configured to detect the at least one of the contact by the operating body and the approach by the operating body.

20. The information processing apparatus according to claim 19, wherein the touch panel comprises a capacitance touch sensor.

21. The information processing apparatus according to claim 19, wherein the touch panel comprises an optical touch sensor.

22. The information processing apparatus according to claim 1, wherein the display comprises a liquid crystal display.

23. The information processing apparatus according to claim 1, wherein each display object of the plurality of display objects corresponds to a respective input region.

24. An information processing method comprising:
controlling a display to display a plurality of display objects that are each operable by an operating body; and
detecting, as an operation interaction upon a select display object selected from the plurality of display objects, at least one of a contact or approach by the operating body upon a surface of the display at a position corresponding to a display location of the select display object,
wherein when the operation interaction is detected upon the select display object, relatively enlarging the select display object and displaying each of the plurality of display objects at respective display locations on the display such that adjacent display objects do not overlap one another, and
wherein the plurality of display objects comprises a first display object type as a display object which is selected by the operation interaction and relatively enlarged for display on the display, a second display object type as a display object which is moved from an original position prior to the relative enlargement of the display object of the first display object type to a relocation position after the relative enlargement of the display object of the first display object type, and a third display object type as a display object which is not changed from before the relative enlargement of the display object of the first display object to after the relative enlargement of the display object of the first display object type.

25. A non-transitory computer-readable medium having embodied thereon a program, which when executed by a computer causes the computer to perform an information processing method, the method comprising:

controlling a display to display a plurality of display objects that are each operable by an operating body; and detecting, as an operation interaction upon a select display object selected from the plurality of display objects, at least one of a contact or approach by the operating body upon a surface of the display at a position corresponding to a display location of the select display object, wherein when the operation interaction is detected upon the select display object, relatively enlarging the select display object and displaying each of the plurality of display objects at respective display locations on the display such that adjacent display objects do not overlap one another, and wherein the plurality of display objects comprises a first display object type as a display object which is selected by the operation interaction and relatively enlarged for display on the display, a second display object type as a display object which is moved from an original position prior to the relative enlargement of the display object of the first display object type to a relocation position after the relative enlargement of the display object of the first display object type, and a third display object type as a display object which is not changed from before the relative enlargement of the display object of the first display object to after the relative enlargement of the display object of the first display object type.

\* \* \* \* \*